Feb. 24, 1959  E. V. SUNDT  2,874,594
SPEED REDUCER
Filed June 10, 1957  3 Sheets-Sheet 3
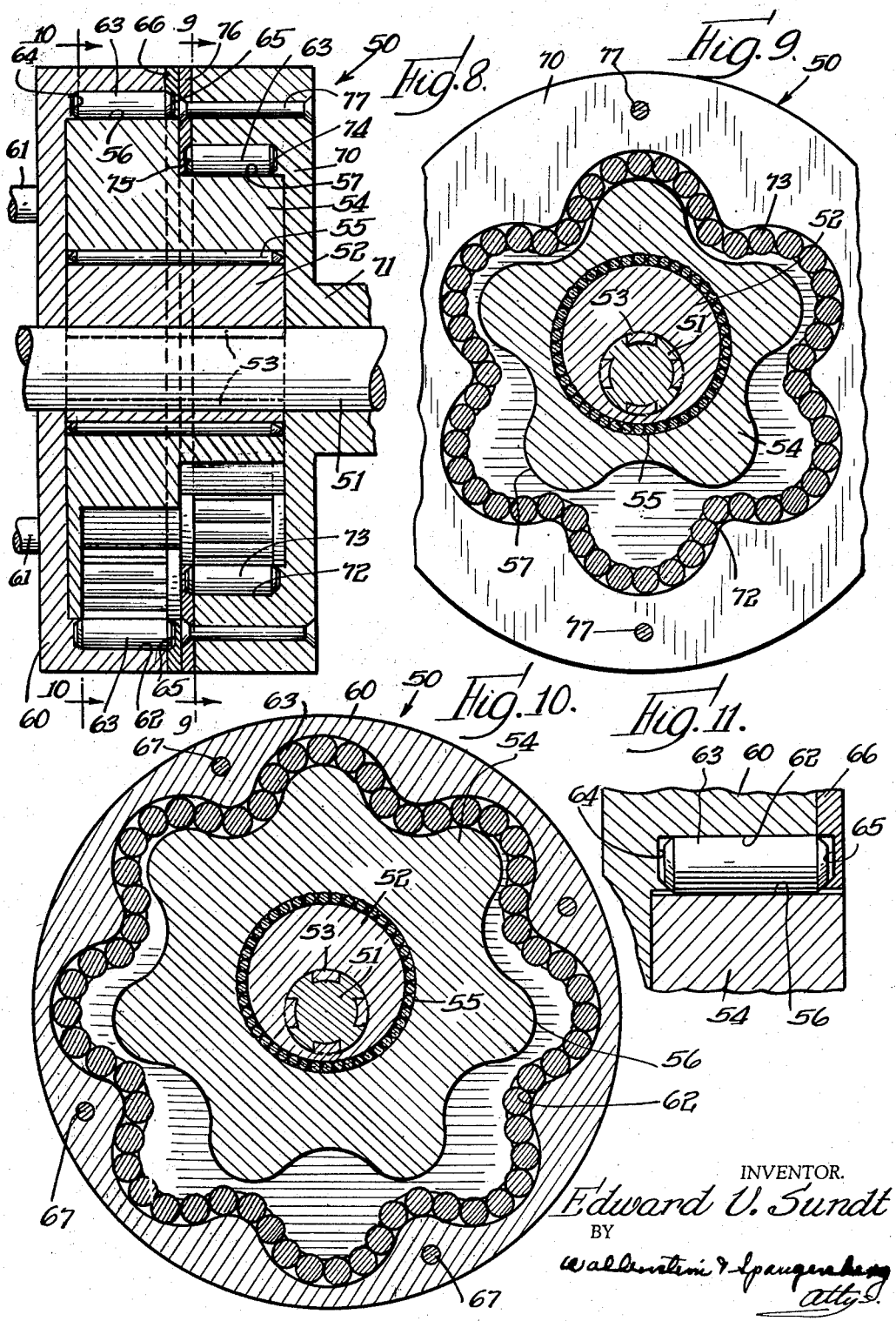
INVENTOR.
Edward V. Sundt
BY United States Patent Office 2,874,594
Patented Feb. 24, 1959

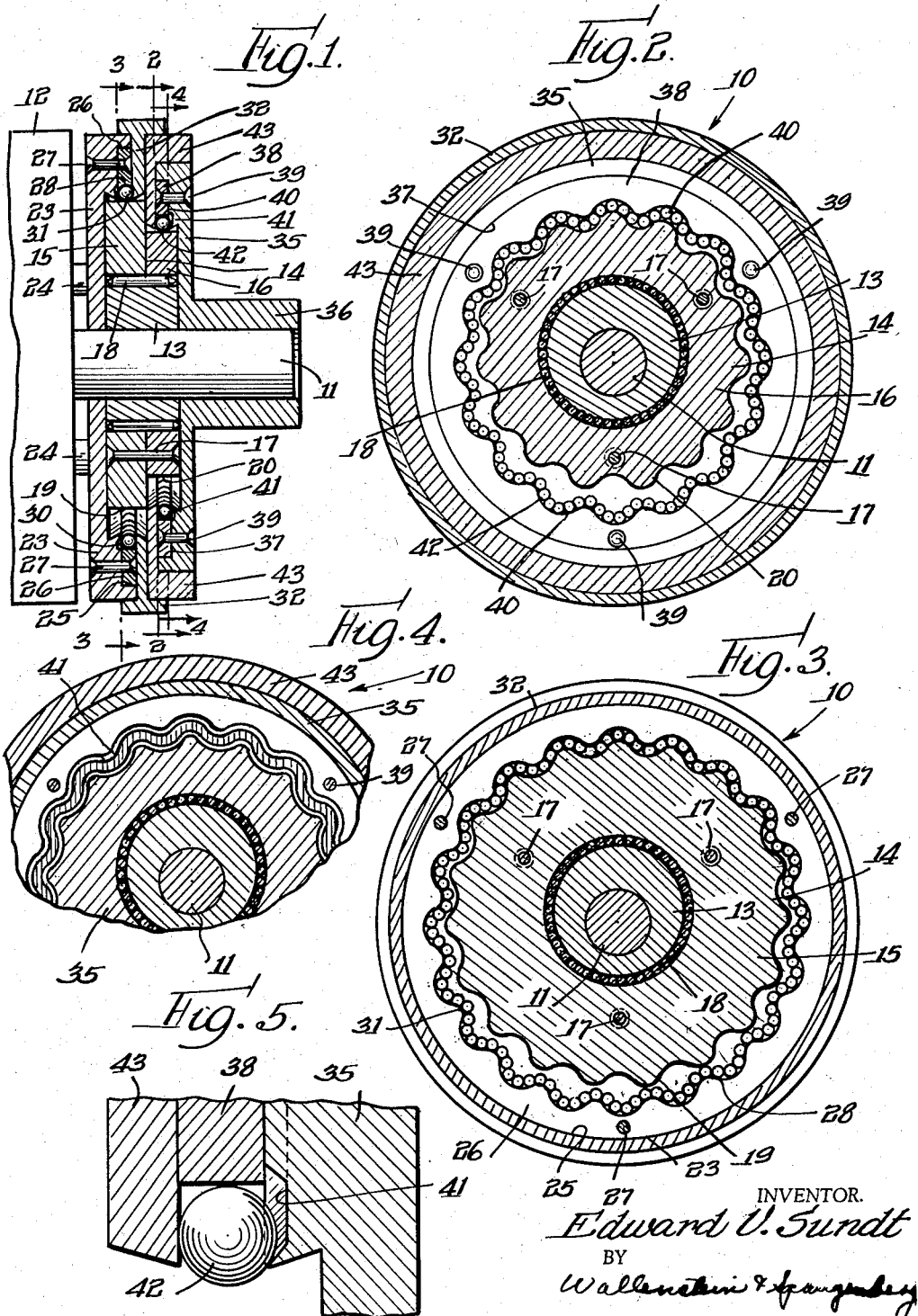

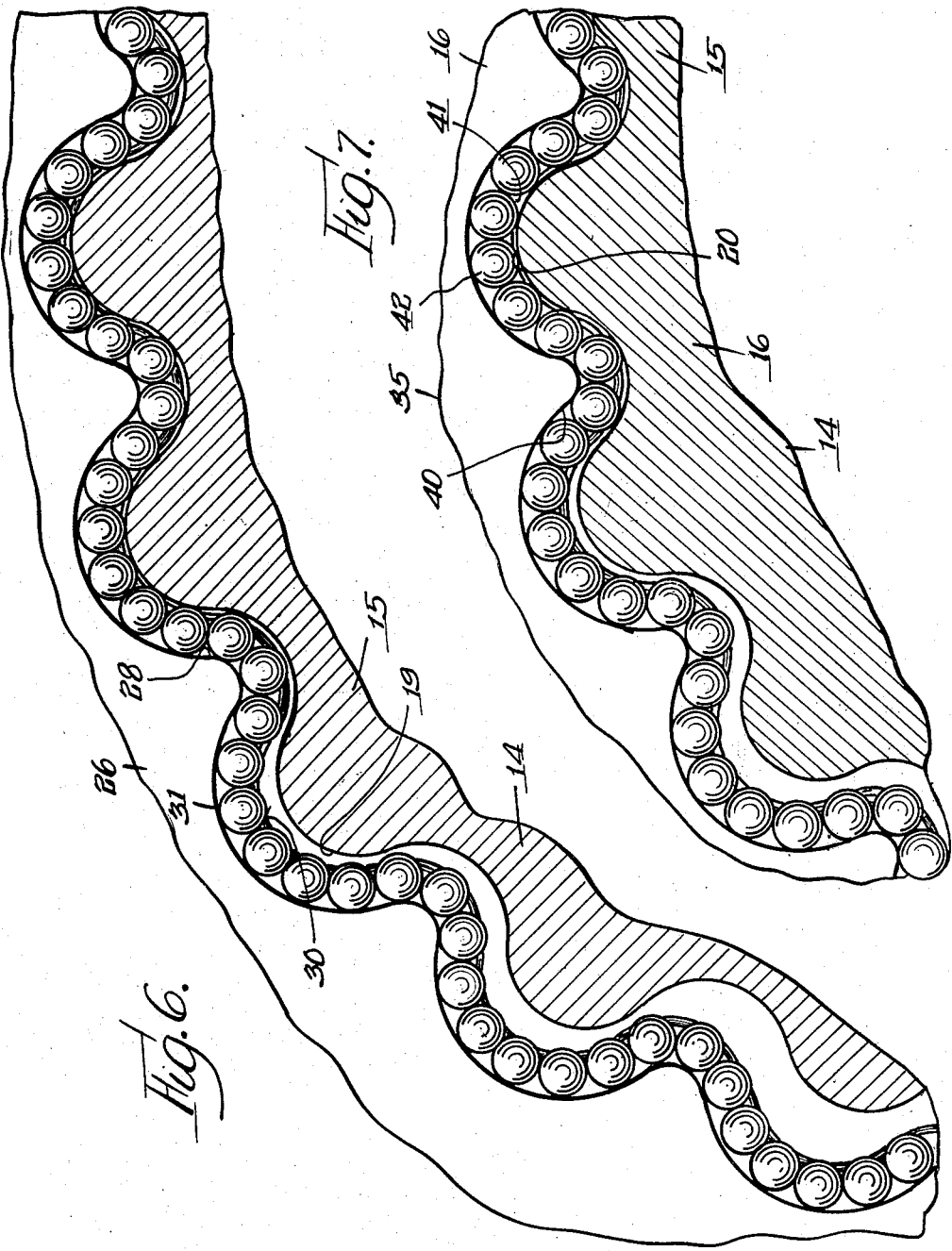

2,874,594

SPEED REDUCER

Edward V. Sundt, Wilmette, Ill.

Application June 10, 1957, Serial No. 664,682

14 Claims. (Cl. 74—805)

This invention is directed to speed reducers of the differential type and more particularly to a multiple speed reducer of that type. Such speed reducers, which employ an eccentric or the like for oscillating a rotor in mesh with an annular internal gear to rotate the same, have not come into wide use due to the relatively low efficiency realized. Such inefficiency has resulted from two principal causes: most important, frictional losses; and lack of uniformity in angular motion, resulting in an irregular speed pattern. The result is that such differential type speed reducers run as low as 2% or 3% and seldom more than 40% efficiency.

The principal object of this invention is to provide an improved differential type speed reducer which realizes high efficiencies, for example, up to over 90% efficiency, with excellent angular velocity characteristics. Such high efficiencies and excellent angular velocity characteristics, according to this invention, are brought about in the differential type speed reducer by interposing rolling elements, such as balls or rollers, between the oscillating member or rotor and the gear member or members meshing therewith for rollingly transmitting torque therebetween, and by making the tooth forms of the teeth on the members which engage the rolling elements radial or substantially circular instead of the conventional involute shape.

Briefly, the speed reducer of this invention includes a rotating shaft, an eccentric carried by the shaft for rotation therewith, an oscillating member rotatably mounted on the eccentric and oscillated thereby, and means for controlling the rotation of the oscillating member with respect to the eccentric. The oscillating member has a ring of teeth thereon and a gear member is rotatably mounted concentrically with the shaft and is provided with teeth thereon in meshing relation with the ring of teeth on the oscillating member. A plurality of rolling elements, such as balls or rollers, are movably carried by one of the member's movement along the teeth of that member and are interposed between the teeth of that member on the teeth of the other member for rollingly transmitting torque from the oscillating member to the gear member for rotating the latter.

Preferably, the teeth on the oscillating member and the gear member are undulating teeth of substantially radial or circular tooth form, and the rolling elements are movably maintained in place by a retaining groove or grooves in the member carrying the rolling elements, the rolling elements being free to circulate from tooth to tooth along the member. Also, the retaining means for the rolling elements are preferably molded from powdered metal impregnated with a lubricant for lubricating the rolling elements.

The means for controlling the rotation of the oscillating member with respect to the eccentric preferably includes another ring of teeth on the oscillating member in meshing relation with teeth on another gear member which is arranged concentrically with the shaft and secured against rotation. Rolling elements are also interposed between these members, in the same manner as expressed above, so as to rollingly react the oscillating member against said other gear member for controlling the rotation of the oscillating member with respect to the eccentric. This construction provides, also, a multiple speed reduction operation.

Further objects of this invention reside in the details of construction of the speed reducer and in the cooperative relationships between the component parts thereof.

Other objects and advantages of this invention will become apparent to those skilled in the art upon reference to the accompanying specification, claims and drawings in which:

Fig. 1 is a vertical sectional view through one form of the speed reducer showing the speed reducer in combination with an electric motor;

Fig. 2 is a vertical sectional view taken substantially along the line 2—2 of Fig. 1;

Fig. 3 is a vertical sectional view taken substantially along the line 3—3 of Fig. 1;

Fig. 4 is a partial vertical sectional view taken substantially along the line 4—4 of Fig. 1;

Fig. 5 is an enlarged vertical sectional view of a portion of the speed reducer mechanism illustrated in Fig. 1;

Figs. 6 and 7 are enlarged partial sectional views illustrating the operation of the speed reducer illustrated in Figs. 1 to 5;

Fig. 8 is a vertical sectional view illustrating another form of the speed reducer of this invention;

Fig. 9 is a vertical sectional view taken substantially along the line 9—9 of Fig. 8;

Fig. 10 is a vertical sectional view taken substantially along line 10—10 of Fig. 8;

Fig. 11 is an enlarged sectional view of a portion of the speed reducer illustrated in Fig. 8.

Referring first to Figs. 1 to 7, one form of the speed reducer of this invention is generally designated as 10, this form of the invention utilizing balls as the rolling elements. The speed reducer 10 includes a rotating shaft 11 which may be driven by an electric motor 12. Secured to the shaft 11, by a press fit, is an eccentric 13 which is preferably formed of powdered iron or the like impregnated with a suitable lubricant. The eccentric 13 secured to the shaft 11 rotates with the shaft 11. Rotatably mounted on the eccentric 13 is an oscillating member 14 which is formed of two parts 15 and 16 suitably secured together by rivets 17. The oscillating member 14 is preferably formed of steel or the like. The oscillating member 14 is preferably rotatably mounted on the eccentric 13 by means of needle bearings 18. The portion 15 of the oscillating member 14 is provided with a ring of teeth 19, the teeth 19 being undulating teeth of substantially radial or circular tooth form. The other portion 16 of the oscillating member 14 is provided with a second ring of teeth 20, which teeth are also undulating and are of substantially radial or circular tooth form.

Concentrically arranged about the shaft 11 is a first gear member 23 which is secured against rotation by being fastened to the motor 12 by studs 24 or the like. Preferably this gear member 23 is formed from powdered iron or the like which is impregnated with a suitable lubricant. The gear member 23 is provided with an angular shoulder 25 within which is arranged a ring 26 secured in place by rivets 27. The ring 26 is preferably formed from hardened steel and is internally formed with teeth 28, the teeth being undulating teeth of substantially radial or circular tooth form.

A plurality of rolling elements in the form of balls 31 are carried by the gear member 23 and the balls 31 extend along the teeth of that gear member. To retain the balls 31 in place on the gear member 23, the gear member 23 is provided with a retaining groove 30 for receiving one side of the balls 31. This retaining groove 30 is an undulating groove corresponding to the undulating teeth on the ring 26. A retainer ring 32 is press fit over the gear member 23 and this retaining ring 32 extends inwardly adjacent the balls 31 for maintaining the same in the undulating groove 30. The balls 31 are interposed between the teeth 28 on the gear member 23 and the teeth 19 on the oscillating member 14 for rollingly reacting the oscillating member 14 against the first gear member 23 for controlling the rotation of the oscillating member 14 with respect to the eccentric 13.

A second gear member 35 is provided with a hub 36 for rotatably mounting the same concentrically with the shaft 11. This second gear member 35 is provided with an internal recess 37 for receiving a ring 38, the second gear member 35 preferably being formed from molded iron or the like impregnated with a suitable lubricant and the ring 38 being formed from hardened steel or the like. The ring 38 is secured in place in the gear member 35 by rivets 39 or the like. The ring 38 is internally provided with teeth 40 which are undulating teeth of substantially radial or circular tooth form.

The second gear member 35 is provided with a retaining groove 41 which receives one side of a plurality of rolling elements, such as balls 42, the balls 42 being held in place in the retaining groove 41 by a ring 43 press fit upon the second gear member 35. The retaining groove 41 is an undulating groove corresponding to the undulating teeth 40 on the ring 38. The balls 42 which are carried by the second gear member 35 are interposed between the teeth 40 of that gear member and the teeth 20 of the oscillating member 14 for rollingly transmitting torque from the oscillating member 18 to the gear member 35 for rotating the latter.

For purposes of illustration herein, it is assumed that the first tooth gear 23 has twenty teeth designated 28, that the first ring 19 of teeth on the oscillating member 14 has nineteen teeth, that the second gear member 35 has sixteen teeth designated 40, and that the second ring 20 of teeth on the oscillating member 14 has fifteen teeth. The formula for determining the speed reduction ratio between the second tooth gear 35 and the shaft 11 may be expressed as follows:

$$\text{Ratio} = \frac{1 - \frac{ac}{bd}}{1}$$

where $a$, $b$, $c$, and $d$ respectively are the numbers of teeth on the first gear member 23, the first ring 19 of gear teeth on the oscillating member 14, the number of teeth in the second ring 40 of gear teeth on the oscillating member 14, and the number of teeth on the second gear member 35. By substituting the appropriate values, the speed reduction ratio becomes $$\text{Ratio} = \frac{\left(1 - \frac{20 \times 15}{19 \times 16}\right)}{1} = \frac{76}{1}$$

Various speed reduction ratios may be obtained by appropriately selecting gear ratios between the first gear member 23, the oscillating member 14 and the second gear member 35.

Referring now to Figs. 8 to 11, another form of the speed reducer is generally designated at 50, this form of speed reducer utilizing rollers instead of balls as the rolling elements. Because of larger surface contact between the rollers and the teeth on the first gear member, the oscillating member and the second gear member, larger torque loads may be carried than where balls are utilized as the rolling elements. Here the rotating shaft 51 may be operated by an electric motor not shown and an eccentric 52 is secured to the shaft 51 for rotation therewith by means of splines or the like, designated at 53. An oscillating member 54 is rotatably mounted on the eccentric 52 by means of needle bearings 55 or the like. The oscillating member 54 is provided with a first ring of teeth 56 which are preferably undulating teeth of substantially radial or circular tooth form. The oscillating member 54 is also provided with a second ring of teeth 57 which are also preferably undulating teeth of substantially radial or circular tooth form. The eccentric 52 may be formed from powdered iron or the like impregnated with a suitable lubricant and preferably the oscillating member 54 is formed from hardened steel.

A first gear member 60 is concentrically arranged about the rotating shaft 51 and may be secured against rotation through the motor, not shown, by studs 61. The gear member 60 is provided with internal teeth 62 which are preferably undulating teeth of substantially radial or circular tooth form. A plurality of rollers 63 are arranged along the undulating teeth 62, the ends of the rollers 63 being tapered and received in a retaining groove 64 formed in the first gear member 60 and a retaining groove 65 formed in a ring 66 secured to the gear member 60 by rivets 67. The retaining grooves 64 and 65 retain the rollers 63 in position on the gear member 60, the rollers 63 being interposed between the teeth 56 and 62 for rollingly reacting the oscillating member 54 against the first gear member 60 for controlling the rotation of the oscillating member 54 with respect to the eccentric 52.

A second gear member 70 is provided with a hub 71 for rotatably mounting the gear member 70 for rotation about the shaft 51. This gear member 70 is provided with internal teeth 72 which teeth are preferably undulating teeth of substantially radial or circular tooth form. A plurality of rollers 73 are arranged along the undulating teeth 72 and they are provided with tapered ends which are received in a groove 74 formed in the gear member 70 and in a groove 75 formed in a ring 76 which is secured to the gear member 70 by rivets 77. The retaining grooves 74 and 75 are preferably undulating grooves corresponding to the undulating teeth 72 in the gear member 70. The rollers 73 are interposed between the teeth 72 and 57 for rollingly transmitting torque from the oscillating member 54 to the gear member 70 for rotating the latter. The gear members 60 and 70 are preferably formed from powdered iron or the like impregnated with a suitable lubricant for lubricating the rollers 63 and 73.

In both forms of the invention the oscillating member is rollingly reacted against the first gear member for controlling the rotation of the oscillating member with respect to the eccentric, and the oscillating member rollingly transmits torque to the second gear member for rotating the latter. Because of this rolling relationship between the first gear member, the oscillating member and the second gear member, afforded by the rolling elements, frictional losses are maintained at a minimum. Because the various teeth are undulating teeth of substantially radial or circular tooth form, excellent angular velocity characteristics are brought about.

For purposes of illustration it is assumed with respect to the speed reducer 50 of Figs. 8 to 11 that the first toothed gear 60 has twenty teeth, that the first ring of teeth 56 on the oscillating member 54 has nineteen teeth, that the second ring of teeth 57 on the oscillating member 54 has fifteen teeth and that the second gear member 70 has sixteen teeth. By substituting the appropriate values in the aforementioned formula, the speed reduction ratio of this form of the invention becomes $$\text{Ratio} = \frac{1 - \left(\frac{8 \times 5}{7 \times 6}\right)}{1} = \frac{21}{1}$$

While for purposes of illustration two forms of this invention have been disclosed, other forms thereof may become apparent to those skilled in the art upon reference to this disclosure, and therefore this invention

I claim as my invention:

1. A speed reducer comprising a rotating shaft, an eccentric carried by the shaft for rotation therewith, an oscillating member rotatably mounted on the eccentric and oscillated thereby and having a ring of teeth thereon, means for controlling the rotation of the oscillating member with respect to the eccentric, a gear member rotatably mounted concentrically with the shaft and having teeth thereon in meshing relation with the ring of teeth on the oscillating member, and a plurality of rolling elements movably carried by one of the members for movement along the teeth of that member and interposed between the teeth of that member and the teeth of the other member for rollingly transmitting torque from the oscillating member to the gear member for rotating the latter.

2. A speed reducer comprising a rotating shaft, an eccentric carried by the shaft for rotation therewith, an oscillating member rotatably mounted on the eccentric and oscillated thereby and having a ring of undulating teeth of substantially circular tooth form, means for controlling the rotation of the oscillating member with respect to the eccentric, a gear member rotatably mounted concentrically with the shaft and having undulating teeth thereon of substantially circular tooth form in meshing relation with the ring of undulating teeth on the oscillating member, and a plurality of rolling elements movably carried by one of the members for movement along the teeth of that member and interposed between the teeth of that member and the teeth of the other member for rollingly transmitting torque from the oscillating member to the gear member for rotating the latter.

3. A speed reducer comprising a rotating shaft, an eccentric carried by the shaft for rotation therewith, an oscillating member rotatably mounted on the eccentric and oscillated thereby and having a ring of teeth thereon, means for controlling the rotation of the oscillating member with respect to the eccentric, a gear member rotatably mounted concentrically with the shaft and having teeth thereon in meshing relation with the ring of teeth on the oscillating member, a plurality of rolling elements, means on one of said members including a retaining groove for movably carrying the rolling elements for movement along the teeth of that member and for interposing the rolling elements between the teeth of that member and the teeth of the other member for rollingly transmitting torque from the oscillating member to the gear member for rotating the latter.

4. A speed reducer comprising a rotating shaft, an eccentric carried by the shaft for rotation therewith, an oscillating member rotatably mounted on the eccentric and oscillated thereby and having a ring of undulating teeth of substantially circular tooth form, means for controlling the rotation of the oscillating member with respect to the eccentric, a gear member rotatably mounted concentrically with the shaft and having undulating teeth thereon of substantially circular tooth form in meshing relation with the ring of undulating teeth on the oscillating member, a plurality of rolling elements, means on one of said members including an undulating groove corresponding to the undulating teeth of that member for movably carrying the rolling elements for movement along the teeth of that member and for interposing the rolling elements between the teeth of that member and the teeth of the other member for rollingly transmitting torque from the oscillating member to the gear member for rotating the latter.

5. A speed reducer comprising a rotating shaft, an eccentric carried by the shaft for rotation therewith, an oscillating member rotatably mounted on the eccentric and oscillated thereby and having a first ring of teeth thereon and a second ring of teeth thereon, a first gear member concentric with the shaft and secured against rotation and having teeth thereon in meshing relation with the first ring of teeth on the oscillating member, a plurality of rolling elements movably carried by one of said oscillating and first gear members for movement along the teeth of that member and interposed between the teeth of that member and the teeth of the other member for rollingly reacting the oscillating member against the first gear member for controlling the rotation of the oscillating member with respect to the eccentric, a second gear member rotatably mounted concentrically with the shaft and having teeth thereon in meshing relation with the second ring of teeth on the oscillating member, a plurality of rolling elements movably carried by one of said oscillating and second gear members for movement along the teeth of that member and interposed between the teeth of that member and the teeth of the other member for rollingly transmitting torque from the oscillating member to the second gear member for rotating the latter.

6. A speed reducer comprising a rotating shaft, an eccentric carried by the shaft for rotation therewith, an oscillating member rotatably mounted on the eccentric and oscillated thereby and having a first ring of undulating teeth of substantially circular tooth form and a second ring of undulating teeth of substantially circular tooth form, a first gear member concentric with the shaft and secured against rotation and having undulating teeth thereon of substantially circular tooth form in meshing relation with the first ring of undulating teeth on the oscillating member, a plurality of rolling elements movably carried by one of said oscillating and first gear members for movement along the teeth of that member and interposed between the teeth of that member and the teeth of the other member for rollingly reacting the oscillating member against the first gear member for controlling the rotation of the oscillating member with respect to the eccentric, a second gear member rotatably mounted concentrically with the shaft and having undulating teeth thereon of substantially circular tooth form in meshing relation with the second ring of undulating teeth on the oscillating member, a plurality of rolling elements movably carried by one of said oscillating and second gear members for movement along the teeth of that member and interposed between the teeth of that member and the teeth of the other member for rollingly transmitting torque from the oscillating member to the second gear member for rotating the latter.

7. A speed reducer comprising a rotating shaft, an eccentric carried by the shaft for rotation therewith, an oscillating member rotatably mounted on the eccentric and oscillated thereby and having a first ring of teeth thereon and a second ring of teeth thereon, a first gear member concentric with the shaft and secured against rotation and having teeth thereon in meshing relation with the first ring of teeth on the oscillating member, a plurality of rolling elements, means on one of said oscillating and first gear members including a retaining groove for movably carrying the rolling elements for movement along the teeth of that member and for interposing the rolling elements between the teeth of that member and the teeth of the other member for rollingly reacting the oscillating member against the first gear member for controlling the rotation of the oscillating member with respect to the eccentric, a second gear member rotatably mounted concentrically with the shaft and having teeth thereon in meshing relation with the second ring of teeth on the oscillating member, a plurality of rolling elements, means on one of said oscillating and second gear members including a retaining groove for movably carrying the last mentioned rolling elements for movement along the teeth of that member and for interposing the rolling elements between the teeth of that member and the teeth of the other member for rollingly transmitting torque from the oscillating member to the second gear member for rotating the latter.

8. A speed reducer comprising a rotating shaft, an eccentric carried by the shaft for rotation therewith, an oscillating member rotatably mounted on the eccentric and oscillated thereby and having a first ring of undulating teeth of substantially circular tooth form and a second ring of undulating teeth of substantially circular tooth form, a first gear member concentric with the shaft and secured against rotation and having undulating teeth thereon of substantially circular tooth form in meshing relation with the first ring of undulating teeth on the oscillating member, a plurality of rolling elements, means on one of said oscillating and first gear members including an undulating groove corresponding to the undulating teeth of that member for movably carrying the rolling elements for movement along the teeth of that member and for interposing the rolling elements between the teeth of that member and the teeth of the other member for rollingly reacting the oscillating member against the first gear member for controlling the rotation of the oscillating member with respect to the eccentric, a second gear member rotatably mounted concentrically with the shaft and having undulating teeth thereon of substantially circular tooth form in meshing relation with the second ring of undulating teeth on the oscillating member, a plurality of rolling elements, means on one of said oscillating and second gear members including an undulating groove corresponding to the undulating teeth of that member for movably carrying the last mentioned rolling elements for movement along the teeth of that member and for interposing said rolling elements between the teeth of that member and the teeth of the other member for rollingly transmitting torque from the oscillating member to the second gear member for rotating the latter.

9. A speed reducer comprising a rotating shaft, an eccentric carried by the shaft for rotation therewith, an oscillating member rotatably mounted on the eccentric and oscillated thereby and having a ring of teeth thereon, means for controlling the rotation of the oscillating member with respect to the eccentric, a gear member rotatably mounted concentrically with the shaft and having teeth thereon in meshing relation with the ring of teeth on the oscillating member, and a plurality of balls movably carried by one of the members for movement along the teeth of that member and interposed between the teeth of that member and the teeth of the other member for rollingly transmitting torque from the oscillating member to the gear member for rotating the latter.

10. A speed reducer comprising a rotating shaft, an eccentric carried by the shaft for rotation therewith, an oscillating member rotatably mounted on the eccentric and oscillated thereby and having a ring of teeth thereon, means for controlling the rotation of the oscillating member with respect to the eccentric, a gear member rotatably mounted concentrically with the shaft and having teeth thereon in meshing relation with the ring of teeth on the oscillating member, and a plurality of rollers movably carried by one of the members for movement along the teeth of that member and interposed between the teeth of that member and the teeth of the other member for rollingly transmitting torque from the oscillating member to the gear member for rotating the latter.

11. A speed reducer comprising a rotating shaft, an eccentric carried by the shaft for rotation therewith, an oscillating member rotatably mounted on the eccentric and oscillated thereby and having a ring of teeth thereon, means for controlling the rotation of the oscillating member with respect to the eccentric, a gear member rotatably mounted concentrically with the shaft and having teeth thereon in meshing relation with the ring of teeth on the oscillating member, a plurality of balls, means on one of said members including flanges on opposite sides of the teeth thereof and a retaining groove in one of the flanges for movably carrying the balls for movement along the teeth of that member and for interposing the balls between the teeth of that member and the teeth of the other member for rollingly transmitting torque from the oscillating member to the gear member for rotating the latter.

12. A speed reducer comprising a rotating shaft, an eccentric carried by the shaft for rotation therewith, an oscillating member rotatably mounted on the eccentric and oscillated thereby and having a ring of teeth thereon, means for controlling the rotation of the oscillating member with respect to the eccentric, a gear member rotatably mounted concentrically with the shaft and having teeth thereon in meshing relation with the ring of teeth on the oscillating member, a plurality of rollers, means on one of said members including flanges on opposite sides of the teeth thereof and a retaining groove in each of the flanges for movably carrying the rollers for movement along the teeth of that member and for interposing the rollers between the teeth of that member and the teeth of the other member for rollingly transmitting torque from the oscillating member to the gear member for rotating the latter.

13. A speed reducer comprising a rotating shaft, an eccentric carried by the shaft for rotation therewith, an oscillating member rotatably mounted on the eccentric and oscillated thereby and having a ring of teeth thereon, means for controlling the rotation of the oscillating member with respect to the eccentric, a gear member rotatably mounted concentrically with the shaft and having teeth thereon in meshing relation with the ring of teeth on the oscillating member, a plurality of rolling elements, means on one of said members including flanges on opposite sides of the teeth thereof and a retaining groove in at least one of the flanges thereof for movably carrying the rolling elements for movement along the teeth of that member and for interposing the rolling elements between the teeth of that member and the teeth of the other member for rollingly transmitting torque from the oscillating member to the gear member for rotating the latter, at least one of the flanges being molded from powdered metal and impregnated with a lubricant for lubricating the rolling elements.

14. A speed reducer comprising a rotating shaft, an eccentric carried by the shaft for rotation therewith, an oscillating member rotatably mounted on the eccentric and oscillated thereby and having a ring of teeth thereon, means for controlling the rotation of the oscillating member with respect to the eccentric, a gear member rotatably mounted concentrically with the shaft and having teeth thereon in meshing relation with the ring of teeth on the oscillating member, a plurality of rolling elements, means on one of said members including a retaining groove for movably carrying the rolling elements for movement along the teeth of that member and for interposing the rolling elements between the teeth of that member and the teeth of the other member for rollingly transmitting torque from the oscillating member to the gear member for rotating the latter, said means for carrying the rolling elements permitting the rolling elements to circulate from tooth to tooth of the member carrying the same.

References Cited in the file of this patent

UNITED STATES PATENTS

| 348,684 | Murray | Sept. 7, 1886 |
| 486,055 | Saladee | Nov. 8, 1892 |
| 1,738,662 | Morison | Dec. 10, 1929 |

FOREIGN PATENTS

| 18,226 | Great Britain | Jan. 28, 1893 |

OTHER REFERENCES

"Design of Powdered Metal Parts," August 1944, Product Engineering, page 561.